United States Patent [19]
Okada et al.

[11] Patent Number: 5,264,966
[45] Date of Patent: Nov. 23, 1993

[54] LENS BARREL

[75] Inventors: Tadanori Okada; Masao Aoyagi, both of Yokohama; Shigeo Nakashima, Kawasaki; Tatsuya Sato; Tatsuo Chigira, both of Yokohama, all of Japan

[73] Assignee: Canon Kabushiki Kaisha, Tokyo, Japan

[21] Appl. No.: 806,361

[22] Filed: Dec. 13, 1991

[30] Foreign Application Priority Data

| Dec. 18, 1990 | [JP] | Japan | 2-412065 |
| Dec. 18, 1990 | [JP] | Japan | 2-412066 |
| Dec. 18, 1990 | [JP] | Japan | 2-412067 |
| Dec. 18, 1990 | [JP] | Japan | 2-412068 |
| Dec. 18, 1990 | [JP] | Japan | 2-412069 |
| Dec. 18, 1990 | [JP] | Japan | 2-412070 |
| Dec. 18, 1990 | [JP] | Japan | 2-412071 |
| Dec. 18, 1990 | [JP] | Japan | 2-412072 |

[51] Int. Cl.$^5$ .................................. G02B 15/14
[52] U.S. Cl. ........................ 359/696; 359/694; 359/823; 354/195.12; 358/225
[58] Field of Search ............ 359/694, 695, 696, 697, 359/698, 699, 700, 701, 702, 703, 704, 705, 822, 823, 824; 354/400, 195.12, 286; 358/225, 227

[56] References Cited

U.S. PATENT DOCUMENTS

| 4,161,756 | 7/1979 | Thomas | 359/696 |
| 4,275,952 | 6/1981 | Uesugi | 359/700 |
| 4,639,083 | 1/1987 | Fuziwara et al. | 359/698 |
| 4,950,060 | 8/1990 | Nagasaka | 359/701 |
| 4,993,815 | 2/1991 | Yamazaki et al. | 359/699 |
| 4,999,656 | 3/1991 | Shimizu et al. | 354/195.12 |
| 5,115,348 | 5/1992 | Notagashira | 359/694 |

FOREIGN PATENT DOCUMENTS 58-78132 5/1983 Japan .
62-140512 9/1987 Japan .

Primary Examiner—Loha Ben
Attorney, Agent, or Firm—Fitzpatrick, Cella, Harper & Scinto

[57] ABSTRACT

A lens barrel of simplified structure including a focusing member supported rotatably about the optical axis and having a gear portion, a lens support member moved in the axial direction in response to the rotation of the focusing member about the optical axis, a driving source provided in a part of the lens support member, and a gear mechanism provided in a part of the lens support member and meshing with the gear portion of the focusing member.

37 Claims, 11 Drawing Sheets

LENS BARREL

BACKGROUND OF THE INVENTION

1. Field of the Invention

The present invention relates to a lens barrel adapted for use in a photographic camera, a video camera or the like.

2. Related Background Art

In the lens barrel of a conventional phototaking (interchangeable) lens adapted to be mounted on a camera body, a motor for driving a focusing lens, gears, a main circuit board with electrical parts etc. are mounted on a fixed tube member used for mounting on the camera body. In such lens barrel, the focusing operation is conducted by controlling the motor by an electrical focusing signal, supplied for example from a focus state detecting device in the camera body, and linearly moving the focusing lens along the optical axis by the driving force of the motor.

In such lens barrel, the motor, gears and main circuit board are mounted, in the fixed tube member, in the vicinity of the mount portion used for coupling with the camera body. For this reason, in the axial movement of the focusing lens for focusing operation, the diaphragm unit and the motor for driving the diaphragm unit are also axially moved. Consequently said motor and the main circuit board have to be connected through a flexible circuit board, and each component inevitably becomes complex.

Also in the conventional photographic camera or video camera, a motor and gears for driving the focusing lens are incorporated in a part of the fixed tube member of the lens barrel, as proposed for example in the Japanese Utility Model Laid-Open Application No. 62-140512. In the automatic focusing mode, the motor is driven by a driving (focusing) signal from a focus state detecting device in the camera body, and the driving (rotating) force of the motor is transmitted to a rotary helicoid member, which is rendered rotatable with respect to the fixed tube member, constituting a part of the lens barrel, thereby linearly moving, in the axial direction, a lens support member, which supports a phototaking (focusing) lens, and is in helicoid coupling with the rotary helicoid member.

Also in the manual focusing mode, the focus state detecting device is deactivated, and the focusing operation is conducted by disconnecting a part of the members for transmitting the driving force of the motor and manually rotating a focusing member.

In the conventional driving mechanism for the lens support member, employing a helicoid member, the helicoid member has to be incorporated with satisfactory precision during assembly and the presence of such helicoid member tends to complicate the entire structure, to increase the number of assembling steps and to render the adjustment of assembly more difficult.

Furthermore, if the rotary and linearly moving helicoid member are to be formed with a plastic material, the helicoid screw has generally to be molded with a mold structure divided into three parts, which tend to be complicated in structure and expensive in cost.

Also FIG. 5 shows, in a cross-sectional view, a lens barrel proposed in the Japanese Utility Model Laid-Open Application No. 62-140512. Referring to FIG. 5, a fixed tube member 41 is provided, at an end thereof, with a bayonet mount 41A for coupling with a camera body (now shown). A first movable ring 42 and a second movable ring 44 respectively support focusing lenses L4-L6 and L1-L3. The second movable ring 44 is provided, on the external periphery thereof, with a fitting portion 44a for fitting with an internal periphery portion 42a of the first movable ring 42, and fixing means for fixing the second movable ring 44 to the first movable ring 42. The fixing means is composed of plural projections 44b, 44b, . . . protruding from the external periphery of the second movable ring 44 and engaging with engaging portions 42b, 42b, . . . , provided on the internal periphery of the first movable ring 42.

A motor 46 supported on the fixed tube member 41 consists of a stator, composed of yokes 46a1, 46a2 fixed on the fixed tube member, a permanent magnet (not shown) etc. and a rotor composed of coils, a rotary shaft 46b etc. Gears G1-Gn linked with the rotary shaft 46b and constituting a gear train for varying the revolution, are supported by a plate member 48 fixed on the fixed tube member 41.

A rotary ring 50, rendered rotatable in a fixed position of the fixed tube member 41, is provided, on the internal periphery thereof, with a helicoid portion 50a engaging with a hellicoid portion 42c formed on the external periphery of the first movable ring 42, and, on the external periphery, with a V-sectioned ball lace groove 50b for supporting bearing balls 52.

The bearing balls 52 are positioned along the groove 50b of the rotary ring 50 in continuous or spaced manner by a ball spacer 54, and are supported by a first ball receiving ring 56, which is fitted in the internal periphery of the fixed tube member 41 and is provided, at an end, with a sloped face, and by a second ball receiving ring 58 screwed on an internal screw 41a of the fixed tube member 41.

A plate-shaped spacer 60 is provided between the first ball receiving ring 56 and the fixed tube member 41, for regulating the pressure on the balls 52, by the thickness of the spacer. A position detector 62, such as an encoder, is provided in the gear mechanism.

The rotary ring 50 is formed with a smaller diameter in a part of its external periphery, and a gear ring 64 is fixed on the smaller diameter portion 50c and meshes with an output gear of the gears G1-Gn.

In the above-explained structure, a space for accommodating the motor 46 and the gears G1-Gn is formed between the movable ring 42 and the fixed tube member 41, and is maintained by members 50, 56, 58 constituting the bearing for the balls 52, 52, . . . and fixed between the fixed tube member 41 and the movable ring 42.

A diaphragm unit D is fixed by the internal periphery and a smaller diameter wall 42e of the movable ring 42, and a motor EMD for driving the diaphragm unit D is fixed thereon.

A rigid printed circuit board 70 bears electrical circuits for driving the motors 46 and EMD. The board 70 is connected with the motor 46 through a flexible printed circuit board (not shown). The board 70 is positioned in a gap between the first movable ring 42 and the mount 41A, and is fixed to the fixed tube member 41.

A contact block 71, for electric signal exchange with the camera body (not shown), is connected, by soldering 71a, with the rigid printed circuit board 70.

A rear cover 69 is fitted in the internal periphery of the bayonet mount 41A. A flexible printed circuit board 72 extends, from a connecting portion 72a with the motor EMD, through a hole 42d in the first movable ring 42, then is bent toward the lens mounting aperture of the camera body, further bent toward the camera body in the space inside the fixed tube member 41 and is soldered at an end 72c to the rigid printed circuit board 70.

In the structure shown in FIG. 5, the motor 46 is driven according to a lens driving signal transmitted from the camera body. The rotating torque of the motor 46 is transmitted, through the gears G1-Gn, to the rotary ring 50, thereby rotating the ring 50 in the fixed position. The rotation of the rotary ring 50 axially moves the first movable ring 42 through the helicoid portion 42c, while the first movable ring 42 is prevented from rotation by key means (not shown). Thus the second movable ring 44 moves together with the first movable ring 42, whereby the lenses L1-L6 are moved axially.

In such mechanism, the flexible printed circuit board 72 follows the movement of the first movable ring 42, and the position of the bent portion 72b of the board 72, between the fixed tube member 41 and the first movable ring 42, moves according to the movement of the first movable ring 42.

In the above-explained conventional lens barrel, the flexible printed circuit board 72 is designed to follow the relative movement of the fixed tube member 41 and the first movable ring 42, by a portion parallel to the optical axis and positioned along the fixed tube member 41 and the first movable ring 42, and a bent portion 72b positioned between the fixed tube member 41 and the first movable ring 42.

Consequently the flexible printed circuit board may be broken by twisting if the first movable ring 42 rotates about the optical axis, and can only follow the axial movement thereof.

In order to enable the flexible printed circuit board to also follow the rotation of the first movable ring 42, there has to be constructed a part that can follow the rotation by extracting such rotating movement, and the structure becomes inevitably complex.

Also the conventional lens barrel of the phototaking (interchangeable) lens, to be mounted on a camera body, includes a fixed tube member (external lens tube) and a focusing member rotatable about the optical axis. These members are formed by resin molding for weight reduction, and are mutually coupled in such a manner that the focusing member is rotatably supported for example by a shouldered member and is prevented, for example by a screw, from disengagement from the fixed tube member.

Such fixed tube member and focusing member, formed by resin molding, do not have sufficient mechanical strength and are apt to be deformed by external pressure, thus resulting in troubles that, for example, the focusing member cannot be properly rotated.

Also the rotation of the focusing member cannot be smooth because the resin-molded sliding portion thereof is in contact with the similarly resin-molded sliding portion of the fixed tube member.

Furthermore, the conventional lens barrel of the phototaking (interchangeable) lens to be mounted on a camera body includes, as principal components, a fixed tube member (external lens tube) and a mount member to be mounted on the camera body. In front of the fixed tube member there is provided a rotatable focusing member (focusing ring), and, inside the fixed tube member there are provided a lens support member axially movable following the movement of the focusing member, a diaphragm unit, a motor for driving said diaphragm unit etc.

In general, the fixed tube member and the mount member are constructed as separate components, in consideration of the assembling process and the adjustment at the assembly.

Because of such separate structure, the assembling of the conventional lens barrel is generally conducted by fitting the focusing the focusing member from the front side (object side) of the fixed tube member, then assembling the motor and gears for rotating the focusing member, from the rear side (camera body side) of the fixed tube member, and finally fitting the mount member at the rear end of the fixed tube member.

As the conventional lens barrel includes the above-mentioned fixed tube member, and mount member which are relatively large external components, the structure of the lens barrel becomes inevitably complex with an increased number of component parts and with complex steps of assembly and adjustments.

Furthermore, the conventional lens barrel of the phototaking (interchangeable) lens to be mounted on a camera body includes a lens support member, for holding the lens, and a cylindrical support member of a different external diameter, for holding the lens support member. Such lens support member and cylindrical support member of different external diameters are mutually fixed by a screw or an adhesive material, as proposed in the Japanese Patent laid-Open Application No. 58-78132.

Such fixing operation of the lens support member and the cylindrical support member in the conventional lens barrel, employing a screw or an adhesive material, requires a significant amount of time for assembly, adjustment and disassembling, thus leading to a high production cost.

Furthermore, the focusing of a phototaking lens is achieved by a manual focusing in which a focusing member (focusing ring) is manually rotated, or by an automatic focusing in which the focusing member is driven by a motor according to a focusing signal obtained by a focus state detecting device of the camera body.

Such automatic focusing is achieved by rotating the focusing member by transmitting the rotating force of a motor through a gear mechanism provided on the fixed tube member of the lens barrel, and the switching of the focusing operation is in most cases done by a selector switch provided on the fixed tube member.

Also in many lens barrels, the lens support member, supporting the focusing lens, is driven by a motor through gear means including plural gears, and such gear means generally incorporates a friction structure, in order to prevent destruction of the gears by an external impact force.

Such conventional friction structure includes input and output gears mutually coupled by friction, for example by a spring, on a common shaft, and the driving torque is transmitted from the input gear to the output gear by the frictional force. When an abrupt external force is applied to the gear means, the two gears mutually rotate against the biasing force of the spring, thereby preventing the destruction of the gears.

However, such friction structure is associated with a complicated structure with a large number of components, such as two divided gears, spring member, stoppers such as E-rings and washers, involving a large number of assembling steps.

SUMMARY OF THE INVENTION

The object of the present invention is to provide a lens barrel with simplified structure and with facilitated assembling and adjustment by providing a lens support member, supporting a focusing lens, with drive means and gear means linked with the drive means.

Other objects of the present invention will become fully apparent from the following detailed description.

DETAILED DESCRIPTION OF THE PREFERRED EMBODIMENTS

Figure 1:
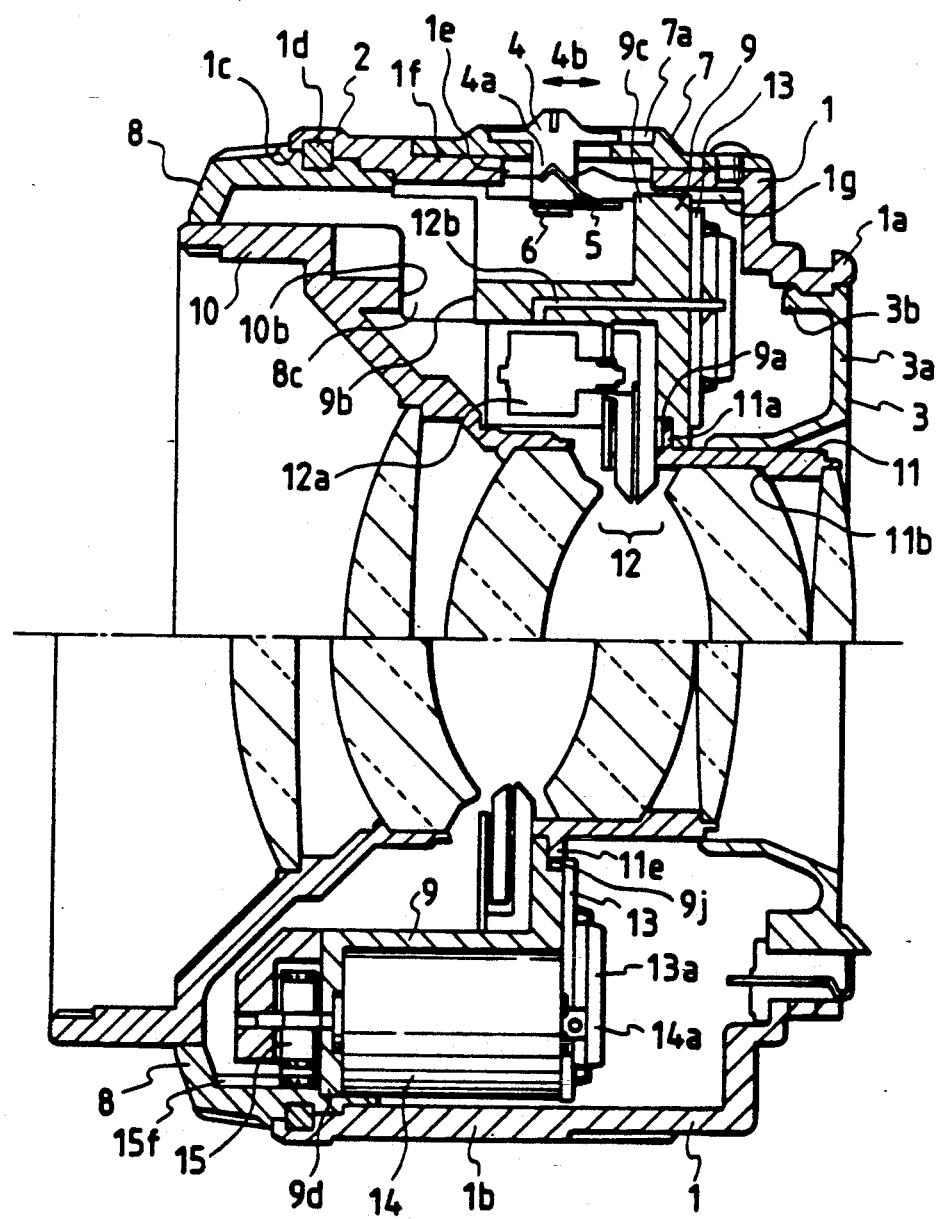
FIG. 1 is a cross-sectional view of a first embodiment of the present invention.
Figure 2:
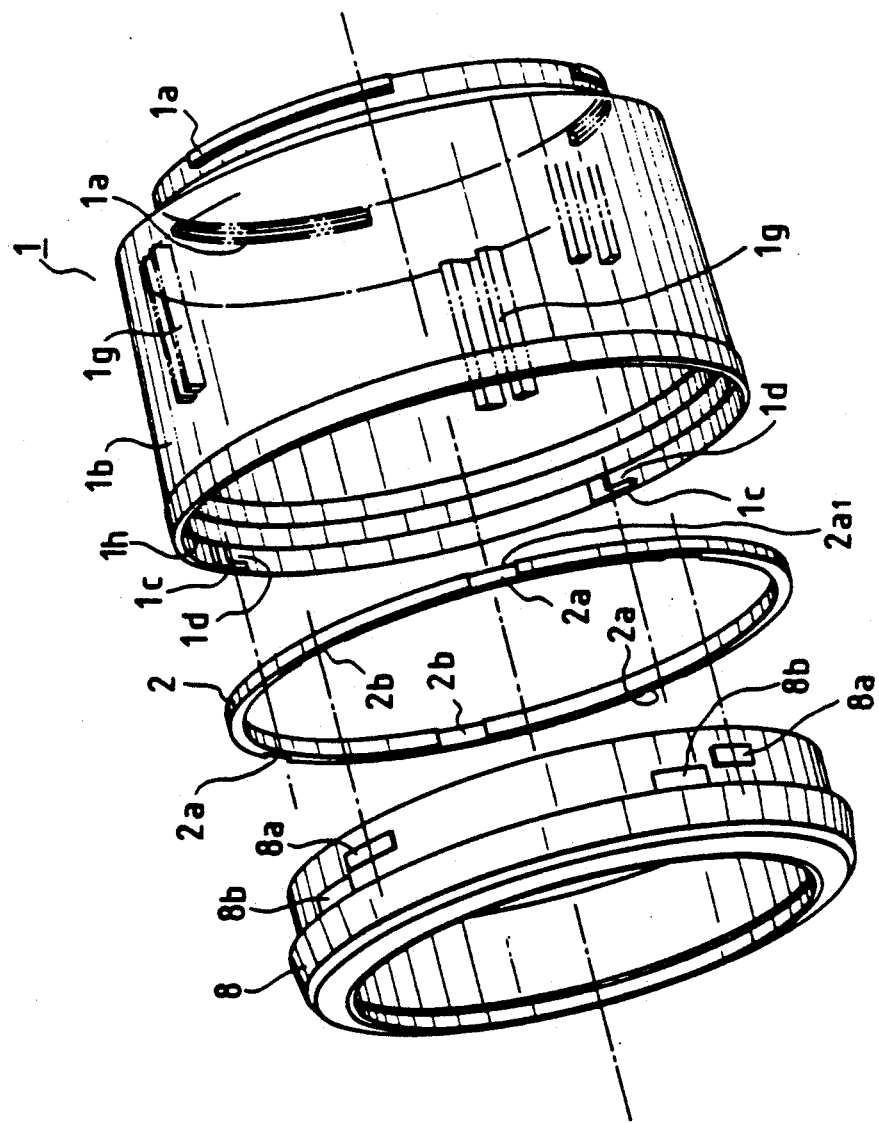
FIGS. 2, 3 and 4 are schematic partial perspective view of the first embodiment shown in FIG. 1.
Figure 3:
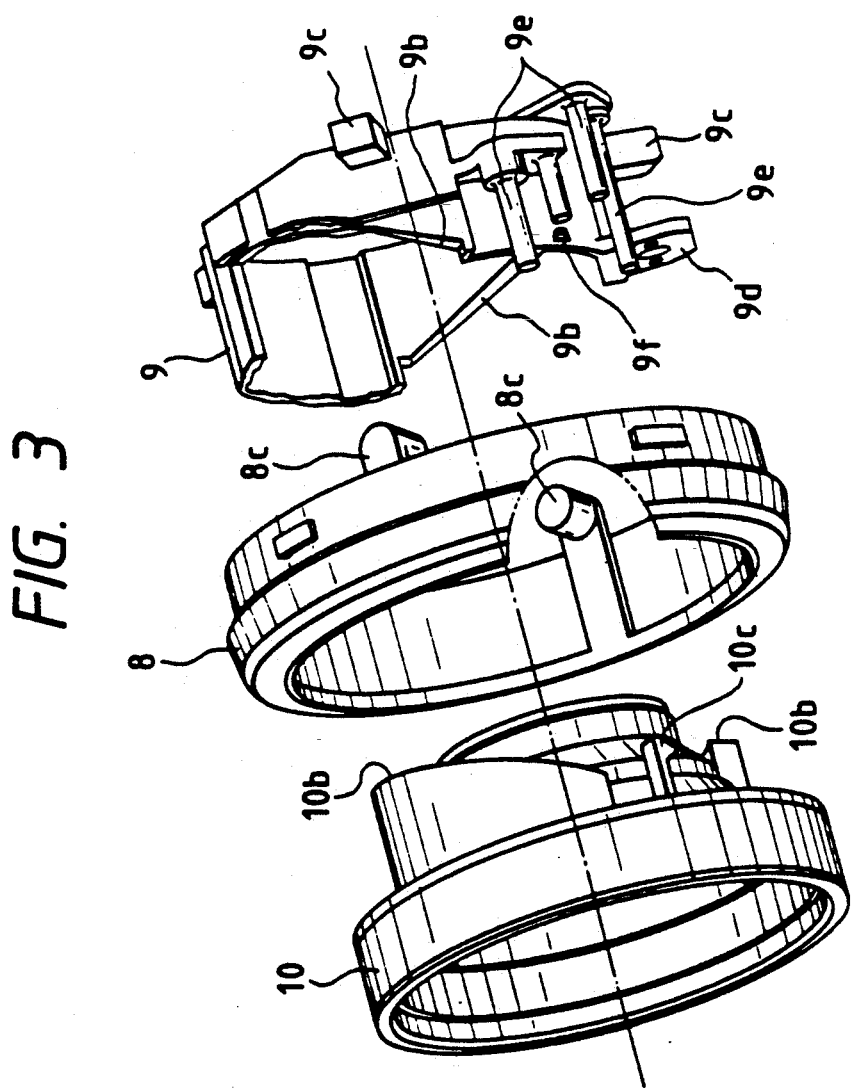
Figure 4:
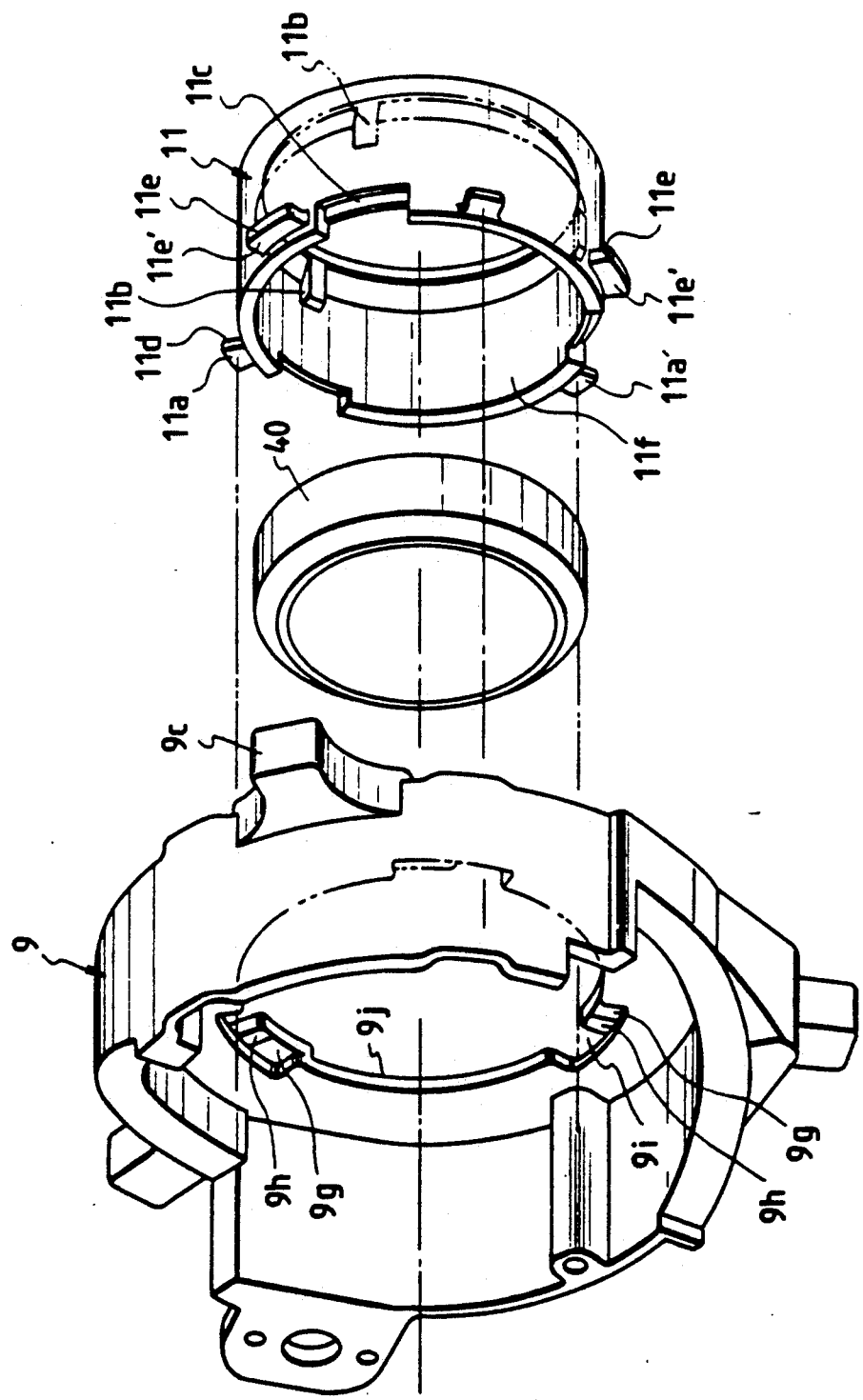

FIG. 1 illustrates a first embodiment of the present invention in a cross-sectional view, and FIGS. 2 to 4 are perspective views of parts of the embodiment shown in FIG. 1.

A fixed tube member 1, formed by resin molding, is provided, at the rear end thereof, with bayonet clamps 1a constituting mounting members for bayonet coupling with a camera body (not shown), and, on the internal periphery at the front end, with bayonet clamps 1c and grooves 1d for bayonet coupling with a reinforcing ring 2. Also on the internal periphery of a tubular portion 1b of the fixed tube member 1, there are provided plural key grooves 1g, parallel to the optical axis, for engaging with keys 9c formed on the external periphery of an intermediate tube 9 constituting a part of a second lens support member to be explained later. The plural key grooves 1g are respectively formed by the portions projected inside the fixed tube member 1 in the radial direction.

The reinforcing ring 2, composed of a metal material, is provided for preventing the deformation of the first tube member 1, and is provided, on the external periphery thereof, with grooves 2a for engaging with the bayonet clamps 1c on the internal periphery of the fixed tube member 1, and, on the internal periphery, with grooves 2b for engaging with bayonet clamps 8a of a focusing member 8 to be explained later. After the reinforcing ring 2 is fitted inside the fixed tube member 1, it is rotated about the optical axis until a lateral face 2a1 of the groove 2a of the reinforcing ring 2 is in contact with a stopper 1h formed on the fixed tube member 1, whereby the reinforcing ring 2 is defined in position in the axial direction, and is fixed to the fixed tube member 1 by the friction with the internal periphery thereof.

A mount cover member 3, fixed on the rear end of the fixed tube member 1 for preventing intrusion of dusts from the rear end, is composed of a disk portion 3a and plural engaging fingers 3b, protruding from the periphery of the disk portion and integrally molded therewith by a resinous material. The mount cover member 3 is integrally fixed with the fixed tube member 1, by fitting the engaging fingers 3b into engaging grooves or holes formed on the fixed tube member 1, utilizing the elasticity of the resinous material.

A selector switch 4 for selecting the automatic focusing mode or the manual focusing mode for a focusing member 8 supports, on a protruding portion 4a, a switch spring 5 mounted by a screw 6, and is rendered slidable, in a direction parallel to the optical axis (direction 4b), along a groove 7a formed in a base member 7, utilizing the elasticity of the switch spring 5. The base member 7 is fixed on a fixing face 1f of the fixed tube member 1, in such a manner that the protruding portion 4a of the switch 4 and the switch spring 5 are rendered movable in a hole 1e formed in the fixed tube member 1.

A focusing member (ring) 8 is rendered rotatable about the optical axis, either manually or electrically by the driving force of an electromagnetic motor 14 to be explained later. The focusing member 8 is provided, in a part of the external periphery thereof, with bayonet clamps 8a which fit into a groove 2b formed on the internal periphery of the reinforcing ring 2, thereby supporting the focusing member 8 in rotatable manner about the optical axis.

Also the focusing member 8 is provided, on a part of the external periphery thereof, with plural protruding sliding faces 8b, which are in sliding contact with the internal periphery of the reinforcing ring 2 when the focusing member 8 is rotated.

An intermediate tube 9, constituting a part of the second lens support member, is provided, on a part of the external periphery thereof, with keys 9c, which are inserted into key grooves 1g formed on the fixed tube member 1, whereby the intermediate tube 9 is rendered movable in a direction parallel to the optical axis.

A front lens group tube 10 constitutes a first lens support member for supporting a front lens group of the phototaking lens. The front lens group tube 10 is fixed to the intermediate tube 9 by fitting plural engaging fingers 10c, integrally formed on the former, into engaging holes 9f formed on the external periphery of the latter.

A rear lens group tube 11 constituting a part of the second lens support member supports a rear lens group of the phototaking lens, and is provided with bayonet clamps 11a, which engage with a groove 9a formed on the intermediate tube 9. The intermediate tube 9 and the rear lens group tube 11 constitute the second lens support member. Also the front lens group tube 10, intermediate tube 9 and rear lens group tube 11 constitute the lens support members linearly movable along the optical axis.

The intermediate tube 9 is provided, on the front end thereof, with a cam face 9b, which is opposed to a cam face 10b formed at the rear end of the front lens group tube 10. The intermediate tube 9 and the front lens group tube 10 are fixed in mutually opposed manner to define a parallel cam groove space by the two cam faces 9b and 10b.

In the cam groove space formed by the cam faces 9b, 10b, a cam follower 8c extending from the focusing member 8 is fitted to constitute the cam structure.

In the present embodiment, rotation of the focusing member 8 about the optical axis causes, through the cam follower 8c, movement of the front lens group tube 10, the rear lens group tube 11 and the intermediate tube 9 integral therewith, in a direction parallel to the optical axis.

Now reference is made to FIG. 4 for explaining the relationship between the intermediate tube 9 and the rear lens group tube 11 positioned therebehind.

The rear lens group tube 11 is molded with a resinous material. A rear lens group 40 is fitted in a fitting portion 11f, and is in contact with impinging projections 11b, which are provided in three positions, with a substantially constant angular distance, on the internal periphery of the tube 11. Caulking fingers 11c, positioned respectively corresponding to the impinging projections 11b, maintain the rear lens group 40 in fixed position by thermal caulking. Three projections (bayonet clamps) 11a are provided on the external periphery of the rear lens group tube 11. An engaging face 11a', constituting a face of each of the projections 11a, engages with an engaging shoulder portion (bayonet portion) 9g of the intermediate tube 9. Three impinging projections 11e are provided, with a substantially constant angular distance, on the external periphery of the rear lens group tube 11, in angularly aberrated positions from the projections 11a. An impinging face 11e' of each of the projections 11e is in contact with an impinging face 9j of the intermediate tube 9, thereby defining the axial position of the rear lens group tube 11.

A highly precise axial distance is maintained between the engaging face 11a' of the projection 11a of the rear lens group tube 11, coupled with the engaging shoulder portion 9g of the intermediate tube 9, and the impinging face 11e' of the impinging projection 11e of the rear lens group tube 11, maintained in impingement on the intermediate tube 9.

The engaging shoulder portions 9g are formed in three positions, with a substantially constant angular distance, on the internal periphery of the intermediate tube 9, for bayonet coupling with the projections 11a of the rear lens group tube 11. Stopping projections 9h are provided respectively adjacent to the engaging shoulder portions 9g, and impinge on the projections 11a when they are in engagement. Gaps 9i are provided respectively adjacent to the engaging shoulder portions 9g, for enabling insertion of the projections 11a of the rear lens group tube 11. An impinging face 9j impinges on the impinging faces 11e' of the impinging projections 11e of the tube 11.

In the following there will be explained the assembling operations of the rear lens group 40, rear lens group tube 11 and intermediate tube 9, with reference to FIG. 4.

At first the rear lens group 40 is fitted into the fitting portion 11f of the rear lens group tube 11, and is fixed by thermal caulking of the caulking fingers 11c while the lens group 40 is in contact with the impinging projections 11b.

Then the projections 11a of the rear lens group tube 11 are inserted into the gaps 9i of the intermediate tube 9, and the lens group tube 11 is rotated clockwise to cause the projections 11a to slide over the projections 9h of the intermediate tube 9 and sit in the engaging shoulder portions 9g, whereby the rear lens group tube 11 is fixed onto the intermediate tube 9. In this state, the axial position of the rear lens group tube 11 is determined by the contact of the impinging faces 11e' of the projections 11e and the impinging face 9j of the intermediate tube, and the rear lens group tube 11 is supported by the elastic deformation of the projections 11a.

A diaphragm unit 12, of which aperture is controlled in known manner by an electromagnetic motor 12a, is fixed by fitting engaging fingers, protruding from the intermediate tube 9, on a front disk face of the diaphragm unit 12.

A main circuit board 13, bearing electrical parts, is fixed by screws on the intermediate tube 9. Coil terminals 12b extending from the motor 12a for driving the diaphragm unit 12 are directly soldered onto the main circuit board 13.

An electromagnetic motor 14, for driving the lens support member consisting of the front lens group tube 10, intermediate tube 9 and rear lens group tube 11, is fixed by means of screws onto a motor mounting portion 9d on the external periphery of the intermediate tube 9. Coil terminal 14a extending from the motor 14 are directly soldered on the main circuit board 13.

A gear train 15 constitutes gear means for transmitting the rotary torque of the motor 14. The gears are respectively supported rotatably by gear shafts integrally formed on the intermediate tube 9, and the final gear meshes with an inner gear 15f formed in a part of the internal periphery of the focusing member 8.

In the following there will be explained the function of the lens barrel of the present embodiment. At first the lens barrel is mounted on the camera body. In the automatic focusing mode, the motor 14 is driven according to a signal obtained in the focus state detecting device provided in the camera body. The rotary torque of the motor 14 is transmitted, through the gear train 15, to the inner gear 15f formed on the internal periphery of the focusing member 8, thereby rotating the focusing member 8 about the optical axis, with respect to the fixed tube member 1.

In the cam groove space, defined by the cam faces 9b, 10b of the intermediate tube 9 and the front lens group tube 10, there is fitted the cam follower 8c of the focusing member 8, and the intermediate tube 9 is rendered movable in the axial direction, with respect to the fixed tube member 1, by means of the key structure consisting of the key 9c and the key groove 1g.

Thus, the rotation of the focusing member causes axial movement of the front lens group tube 10 and the intermediate tube 9 through the cam follower 8c. Also the rear lens group tube 11, which is bayonet coupled with the intermediate tube 9, axially moves integrally with the intermediate tube 9 at the same time.

In the manual focusing mode, the selector switch 4 is shifted to the manual mode thereby disconnecting a part of the gear train 15 in such a manner that the rotary torque of the motor 14 is not transmitted to the focusing member 8. In this state same functions as explained above are attained by manual rotation of the focusing member 8.

In the present embodiment, the focusing operation is achieved by integral movement, parallel to the optical axis, of the front lens group tube 10, intermediate tube 9, rear lens group tube 11, motor 14 mounted on the motor mounting portion 9d on the external periphery of the intermediate tube 9, gear train fitted on the gear shafts integrally formed on the intermediate tube 9, and main circuit board 13 fixed on the intermediate tube 9, in response to the rotation of the focusing member 8 about the optical axis.

In the present embodiment, the components constituting the lens barrel are constructed as explained above, wherein the coil terminals of the motor for driving the diaphragm unit are extended to and directly soldered to the main circuit board without employing a flexible circuit board, so that the lens barrel can be simplified in structure, facilitated in assembling and adjustment and reduced in production cost.

Also in the present embodiment, components such as the fixed tube member, focusing member, first and second lens support members etc. constituting a part of the lens barrel are constructed without the use of a helicoid member as explained above, whereby the lens barrel can be simplified in structure, facilitated in assembling and adjustment and reduced in production cost.

Figure 6:
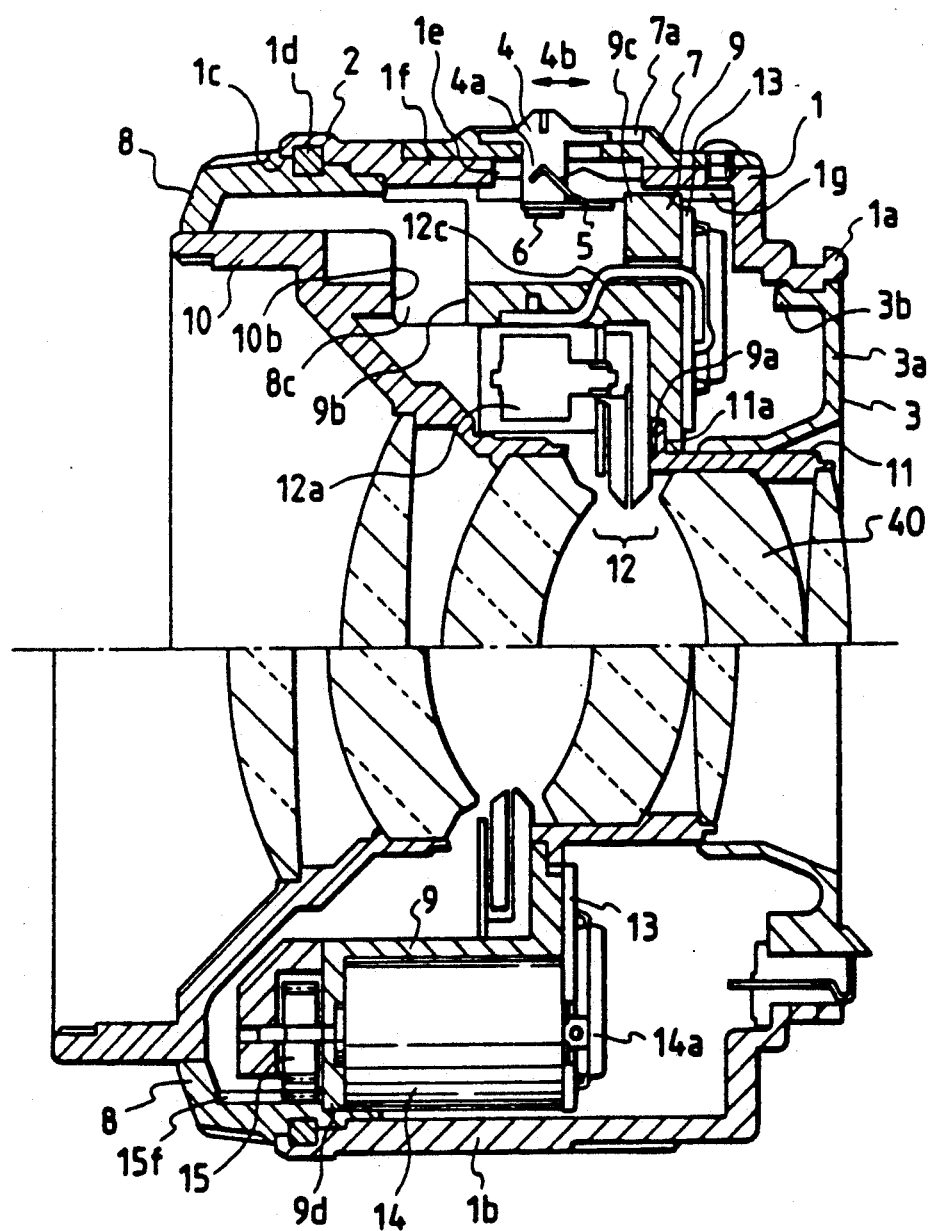
FIG. 6 is a cross-sectional view of a second embodiment of the present invention.
Figure 7:
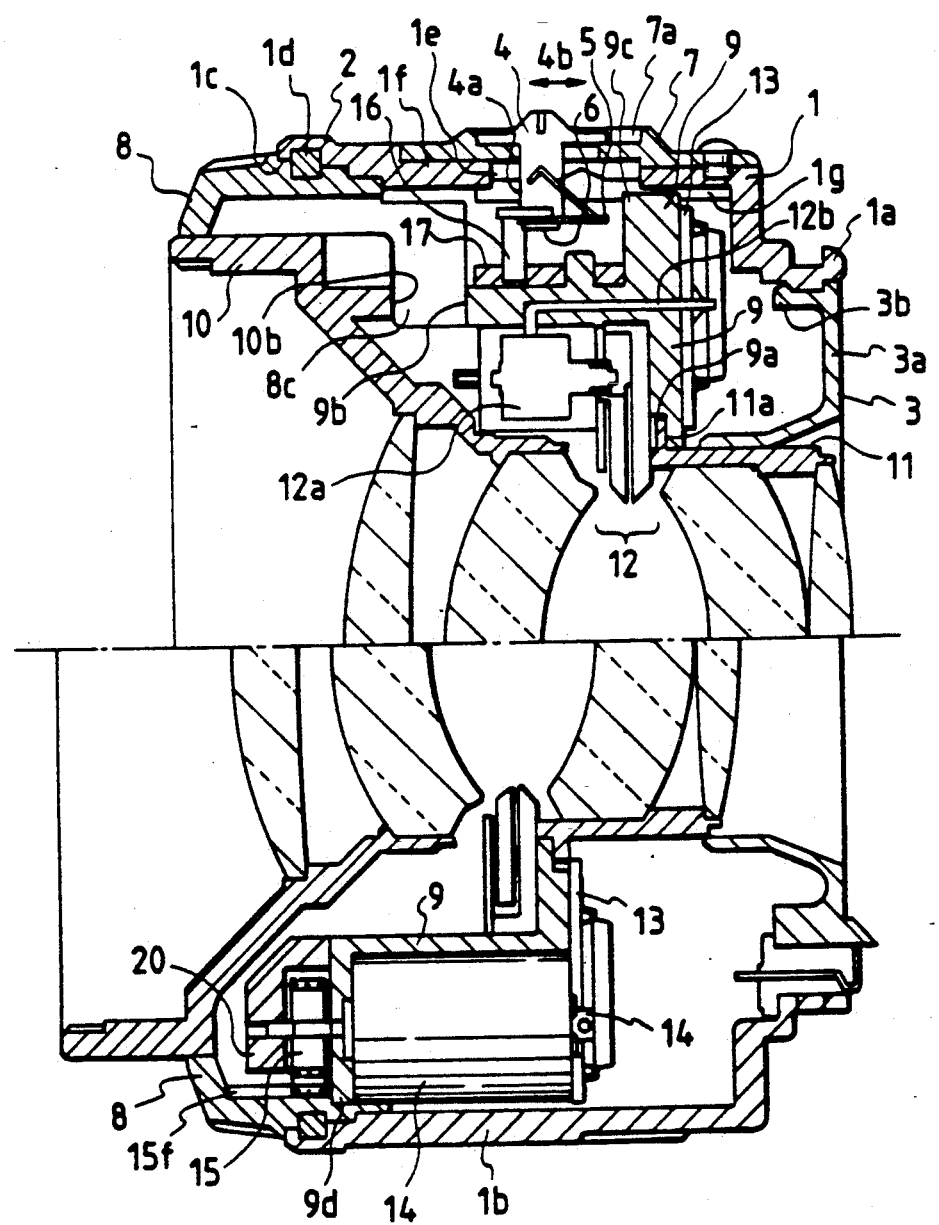
FIG. 7 is a cross-sectional view of a third embodiment of the present invention.
Figure 8:
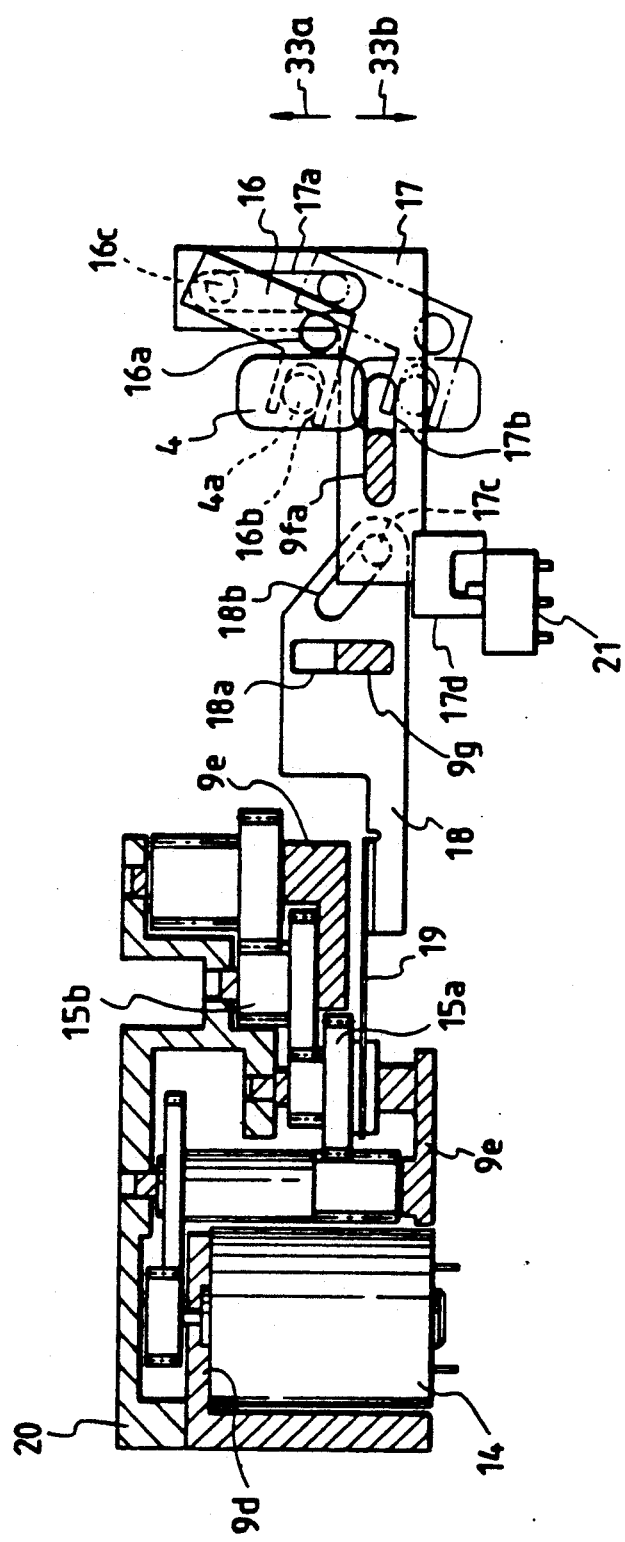
FIGS. 8 to 12 are magnified partial views of the third embodiment shown in FIG. 7.

FIG. 6 illustrates a second embodiment of the present invention, which is different from the foregoing first embodiment in the parts explained in the following.

Figure 5:
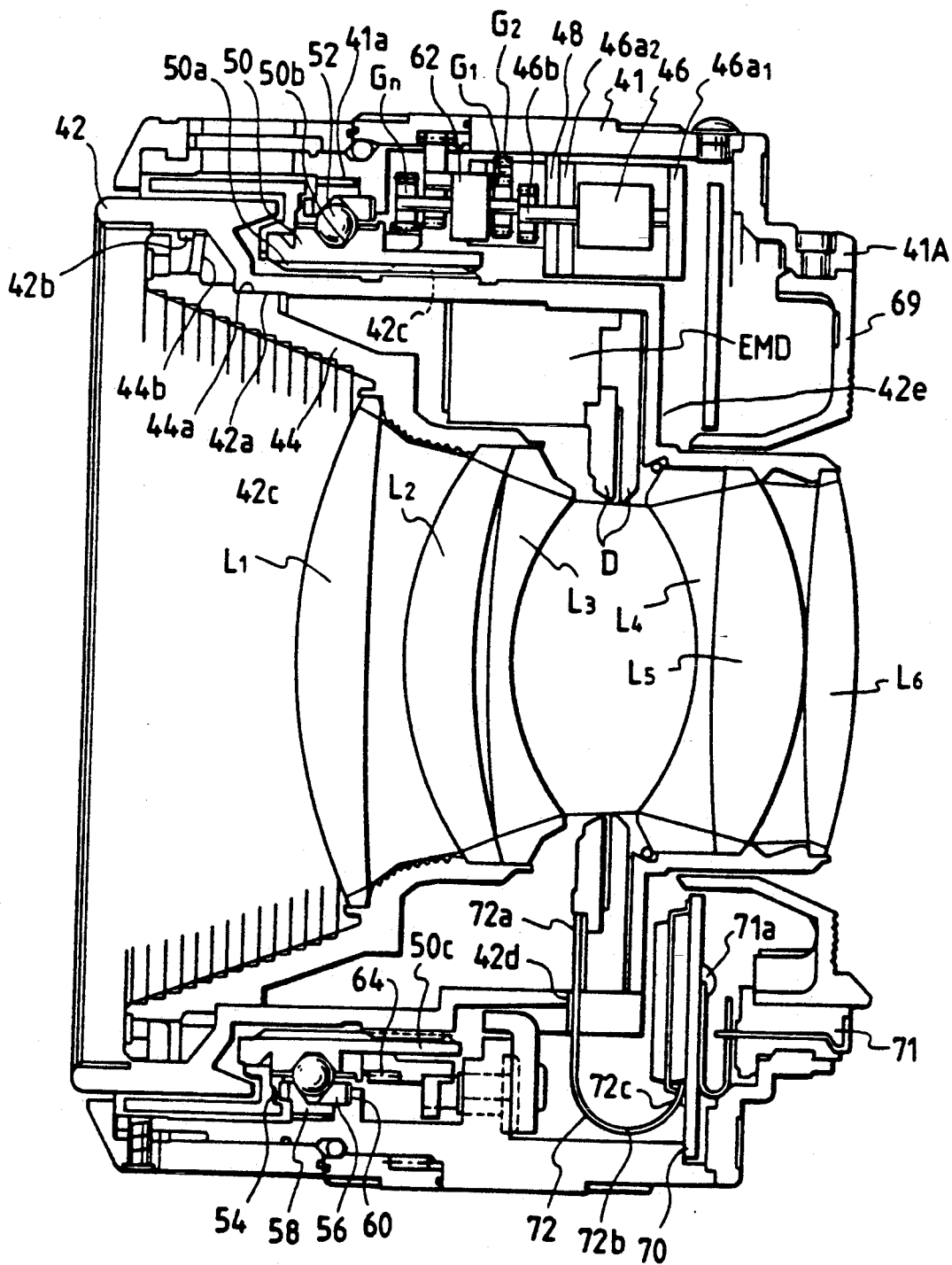
FIG. 5 is a cross-sectional view of a conventional lens barrel.

A motor 12a for driving a diaphragm unit 12 is different from that in the conventional structure shown in FIG. 5 and is directly soldered to a main circuit board 13 through a flexible printed circuit board 12c without the U-shaped movement absorbing mechanism.

In this second embodiment, the above-explained configuration of the components constituting a part of the lens barrel always to reduce the number of flexible printed circuit boards involving the movement absorbing mechanism, to directly connect the printed circuit board with the motor and to integrally move the electric circuits other than the contacts at the mount, whereby the lens barrel can be simplified in structure, facilitated in assembling and adjustment, and reduced in production cost.

Also according to the first and second embodiments, the fixed tube member, metal reinforcing ring and focusing member, constituting a part of the lens barrel are constructed as explained before, thereby improving the mechanical strength and also providing smoother feeling of operation in the rotation of the focusing member, because of the contact between a metal sliding face and a resin sliding face, in comparison with the conventional contact between the resin sliding faces.

Also the fixation of the fixed tube member and the reinforcing ring by bayonet coupling, without screws or adhesive material, allows to provide a lens barrel facilitated in assembling and adjustment.

Furthermore, according to the first and second embodiments, the components are mounted as explained above on the fixed tube member constituting a part of the lens barrel and the mount member is also integrated with the tube member, whereby the lens barrel can be simplified in structure, facilitated in assembling and adjustment, and reduced in production cost.

In the following there will be explained a third embodiment of the present invention with reference to FIGS. 7 to 10. The following description will be concentrated on the points different from the foregoing first embodiment.

Clutch levers 16, 17, 18 shift one of the gears 15 along the gear shaft. The clutch member 16 is rotatably supported about a shaft 16a on a fixed base plate 7, and a U-shaped groove 16b at an end engages with a protrusion 4a of the switch 4. The clutch lever 16 is provided, on the other end, with a protruding part 16c, which engages with an elongated hole 17a, formed on the clutch lever 17 and having a length larger than the total amount of movement of the lens barrel along the optical axis.

Also in a hole 17b formed on the clutch lever 17 and elongated in a direction perpendicular to the optical axis, there engages a protruding part 9fa formed on the external periphery of the intermediate tube 9, in movable manner in the direction perpendicular to the optical axis.

Also in an elongated hole 18a formed, parallel to the optical axis, on the clutch lever 18, there engages, movably in the axial direction, a protruding part 9g formed on the external periphery of the intermediate tube 9. Furthermore, a protruding portion 17c formed on the clutch lever 17 engages with a hole 18b elongated in a direction inclined to the optical axis on the clutch lever 18. Also on a part of the clutch lever 18, there is fixed an elastic member 19 having a U-shaped engaging part 19a at an end engaging with the gear.

A pressing plate 20, maintaining the gears 15a–15e in position, is fixed with screws to the intermediate tube 9. An electrical switch 21, for discriminating whether the camera body (not shown) is in the automatic or manual focusing mode, is directly soldered to the main circuit board 13.

In the following explained is the switching between the automatic and manual focusing modes by the selector switch 4. At first explained is the switching from the automatic focusing mode shown in FIG. 8 to the manual focusing mode shown in FIG. 9.

The switch 4 is axially moved as indicated by an arrow 4b, whereby the clutch lever 16 rotates about the shaft 16a mounted on the base member 7. The protruding part 16c at an end of the clutch lever 16 engages with the elongated hole 17a, parallel to the optical axis, of the clutch lever 17 rendered movable, in a direction perpendicular to the optical axis, with respect to the intermediate tube 9. Also the protruding part 17c at the output side of the clutch lever 17 engages with the elongated hole 18b, inclined to the optical axis, of the clutch lever 18 rendered movable, parallel to the optical axis, with respect to the intermediate tube 9.

Consequently the axial movement of the switch 4 is converted by the clutch lever 16 into a movement of the clutch lever 17 in a direction perpendicular to the optical axis, and further to an axial movement of the clutch lever 18. At the same time the electrical switch 21 is actuated by the actuating part 17d, according to the perpendicular movement of the clutch lever 17.

Figure 9:
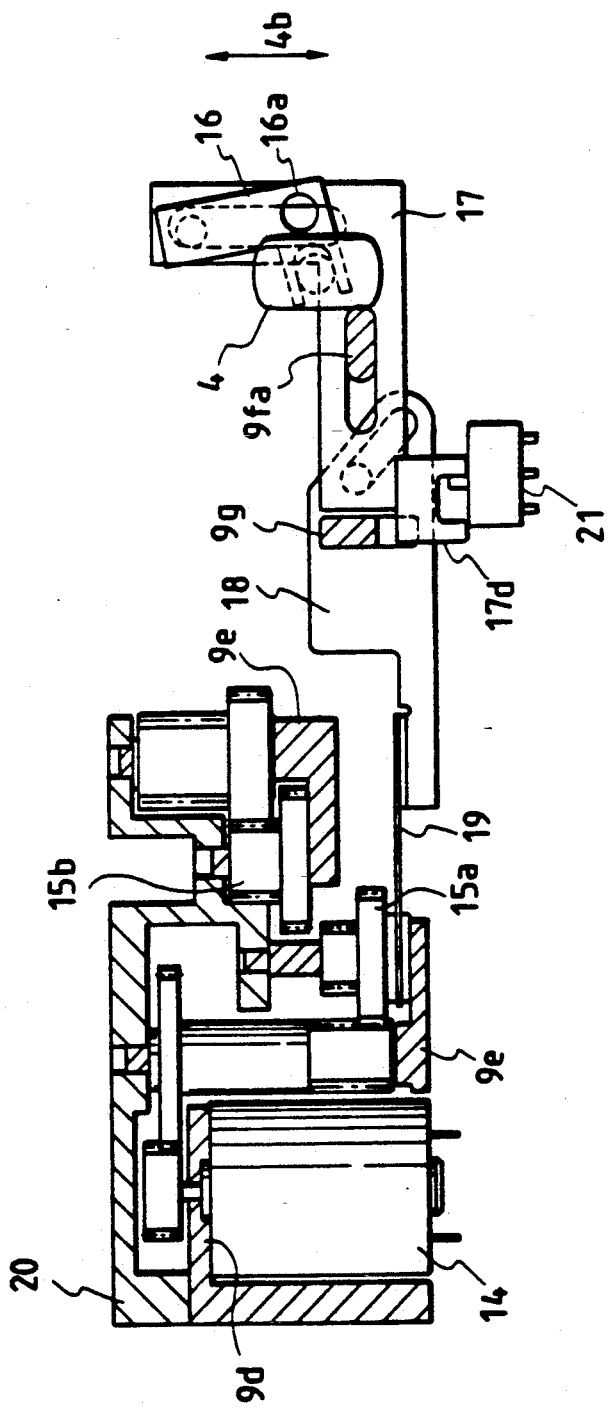
Figure 10:
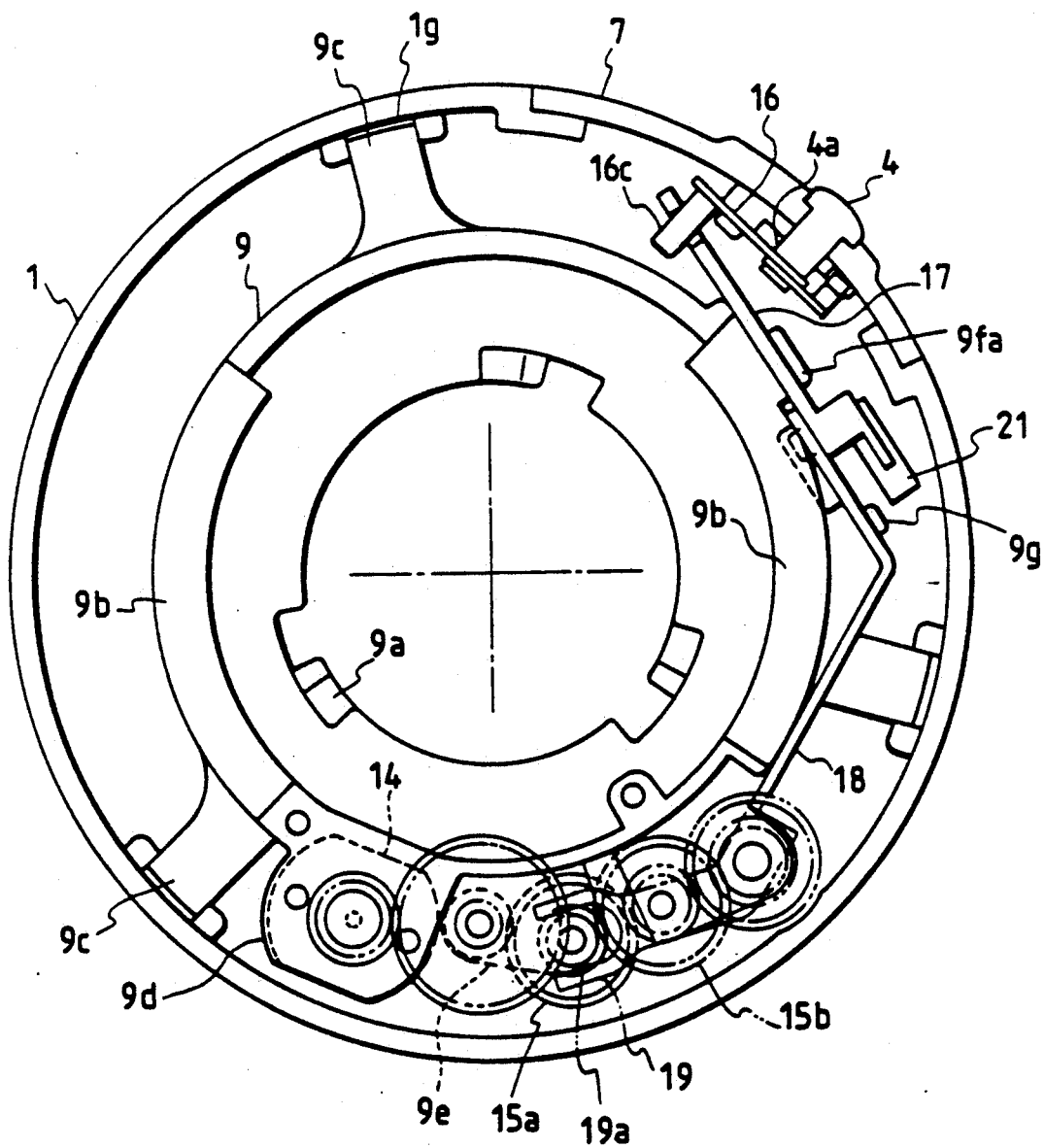

The elastic member 19, fixed on an end of the clutch lever 18 shifts the gear 15a of the gear means 15 in the axial direction (arrow 4b) as shown in FIG. 9, thereby disengaging the gear 15a from the gear 15b.

In the present embodiment, the automatic and manual focusing modes are switched by engaging or disengaging the gear 15a with or from the gear 15b, through the above-explained clutch mechanism.

When the switch 4 is shifted to the automatic focusing side along the arrow 33a the gear 15a meshes with the gear 15b whereby the driving force of the motor 14 is transmitted to the focusing member 8 thereby enabling the motor to displace the lens support members. On the other hand, when the switch 4 is moved to the manual focusing side along the arrow 33b, the gear 15a is disengaged from the gear 15b, whereby the focusing member 8 is released from the driving force of the motor 14 and is rendered manually operable.

Although the mutual distance, along the optical axis, between the clutch lever 16 mounted on the base member 7 fixed on the fixed tube member 1 and the clutch lever 17 mounted on the intermediate tube 9 varies according to the amount of advancement of the lens barrel, the movement of the switch 4 is transmitted to the gear 15a without being influenced by the amount of advancement of the lens barrel, since the length of the elongated hole 17a of the clutch lever 17 is made longer, in a direction parallel to the optical axis, than the amount of entire advancement of the lens barrel. Stated differently, the switch 4 is linked with the clutch mechanism, despite of the axial movement thereof.

In the present embodiment, as explained in the foregoing, the focusing operation is achieved by integral axial movement of the front lens group tube 10, intermediate tube 9, rear lens group tube 11, motor 14 mounted on the mounting portion 9d on the external periphery of the intermediate tube 9, gear train 15 fitted on the gear shafts formed integrally with the intermediate tube 9, and main circuit board 13 fixed on the intermediate tube 9, in response to the rotation of the focusing member 8 about the optical axis.

The third embodiment of the present invention, with the auto focusing gear mechanism and the clutch mechanism for switching the automatic and manual focusing modes constructed as a part of the lens barrel as explained in the foregoing, allows effective utilization of the space in the lens barrel and compactization of the entire barrel.

In the following there will be explained a fourth embodiment of the present invention, with reference to FIGS. 11 and 12. The following description will be concentrated on points different from the foregoing first embodiment.

Figure 11:
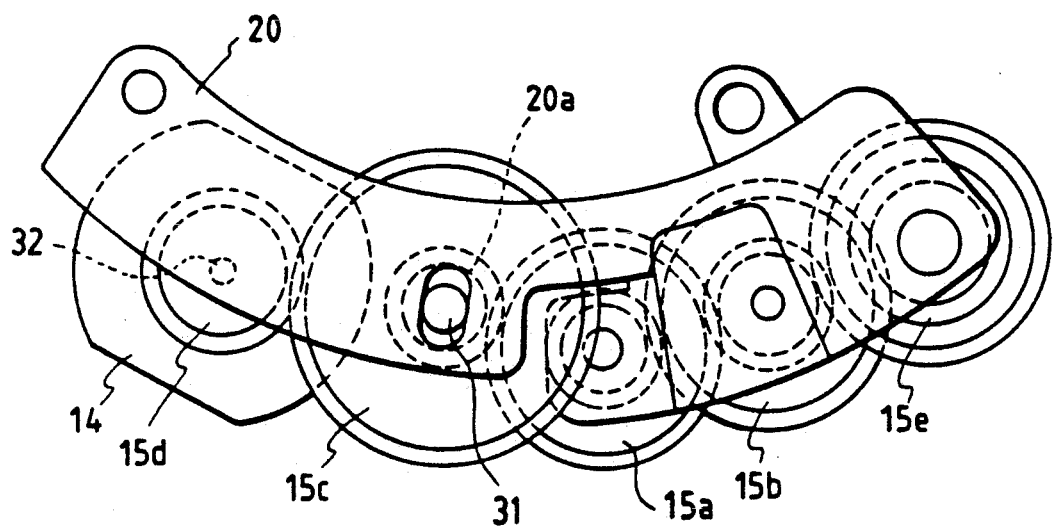
Figure 12:
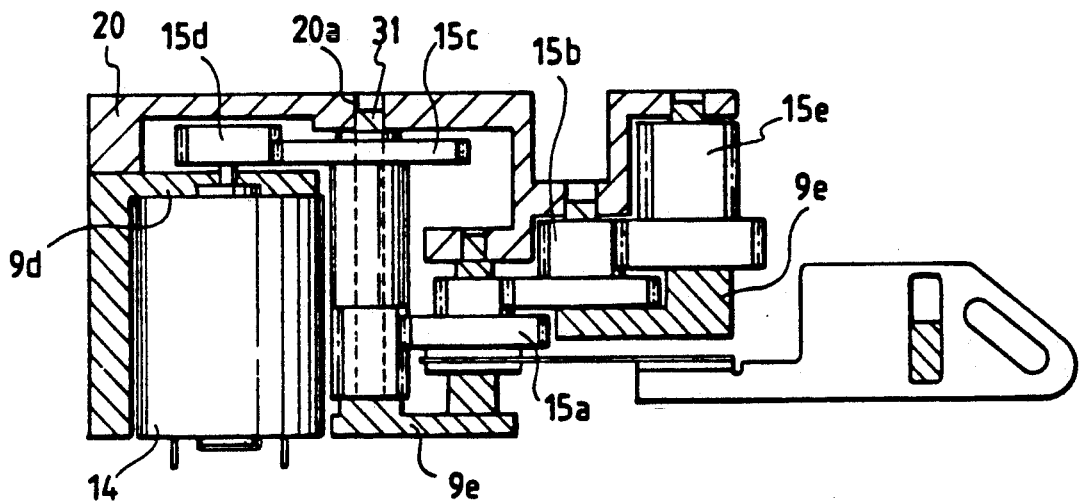

FIGS. 11 and 12 illustrate the feature of the gear means 15 of the present embodiment. A gear support plate 20, fixed by screws on the front end of the intermediate tube 9, supports and fixes the shafts of the gears thereby rotatably maintaining plural gears 15a–15d constituting the gear means 15. The support plate 20 is provided with an elongated guide hole 20a, which elastically deformably supports a gear shaft 31 of the gear 15c among the plural gears.

The gear shaft 31 is composed of a resinous material and is integrally molded with the intermediate tube 9, and is rendered displaceable in the elongated hole 20a by the elasticity of the resinous material. Thus an impact applied externally to the focusing member 8, or an impact generated by the driving torque of the motor 14 when the focusing member 8 impinges on the rotation stopper in the course of the focusing operation, is absorbed by a displacement of the gear 15c and the gear shaft 31 in the elongated hole 20a, whereby the destruction of gear teeth is effectively prevented.

More particularly, in the present embodiment, the elongated hole 20a is formed as an arc, having the center at a gear shaft 32 of the gear 15d of the motor side, engaging with the gear 15c. Consequently, the eventual displacement of the gear 15c by the above-mentioned impact takes place along the arc, whereby the gear 15c can absorb the external impact while maintaining the stable meshing state, and then return to the normal meshing state.

The 4th embodiment, with the drive means and gear means constituting a part of the lens barrel constructed in the above-explained manner, provides a friction structure capable of absorbing the external impact applied to the gears and effectively preventing the destruction of gears, while simplifying the structure of the lens barrel and facilitating the assembling and adjustment.

What is claimed is:

1. A lens barrel comprising:
   a) a focusing member having an optical axis supported rotatably about the optical axis and having a gear portion;
   b) a lens support member rendered axially movable in linkage with the rotation about the optical axis of said focusing member;
   c) drive means provided in a part of said lens support member; and
   d) gear means provided in a part of said lens support member and meshing with said gear portion of said focusing member.

2. A lens barrel according to claim 1, wherein said focusing member is so supported as not to be displaceable in the axial direction.

3. A lens barrel according to claim 2, further comprising a fixed tube member supporting said focusing member in such a manner as to be movable only about the optical axis, wherein said lens support member is positioned in the internal periphery of said fixed tube member.

4. A lens barrel according to claim 3, wherein said lens support member includes a shaft for rotatably supporting the gear of said gear means.

5. A lens barrel according to claim 3, wherein said focusing member is formed as a tube, and said gear portion is formed on the internal periphery thereof.

6. A lens barrel according to claim 2, further comprising a second lens support member rendered movable in the axial direction, in synchronization with the axial movement of the first-mentioned lens support member.

7. A lens barrel according to claim 6, wherein said lens support member is provided with a first cam, while said second lens support member is provided with a second cam, and said focusing member is provided with a cam follower maintained in contact with said first and second cams, whereby said lens support member and said second lens support member move in the axial direction by amounts corresponding to the displacements of said first and second cams, in response to the rotation of said focusing member about the optical axis.

8. A lens barrel according to claim 2, wherein said lens support member is provided with a cam while said focusing member is provided with a cam follower maintained in contact with said cam, whereby said lens support member moves in the axial direction by an amount corresponding to a displacement of said cam, resulting from the rotation of said focusing member about the optical axis.

9. A lens barrel according to claim 2, wherein said drive means is composed of a motor directly mounted on said lens support member.

10. A lens barrel, comprising:
    a) a first lens support member supported movably in the axial direction and provided with a first cam face;
    b) a second lens support member supported movably in the axial direction and provided with a second cam face, said first and second cam faces substantially constituting a groove; and
    c) a focusing member supported rotatably about the optical axis and provided with a cam follower which is inserted into said groove formed by said first and second cam faces, whereby said first and second lens support members are axially displaced by the rotation of said focusing member about the optical axis.

11. A lens barrel according to claim 10, wherein said first lens support member is provided with a motor, of which rotation is utilized for rotating said focusing member about the optical axis.

12. A lens barrel according to claim 11, wherein gear means is used for transmitting the rotation of said motor to said focusing member, and said gear means includes a gear portion with gear teeth extended in the axial direction, in order to accommodate the axial mutual displacement of said first lens support member and said focusing member.

13. A lens barrel, comprising:
a lens support member supporting a lens and supported movably in the axial direction; and
at least a first motor, mounted on said lens support member, for lens driving, and a second motor, mounted on said lens support member, for driving a diaphragm mechanism.

14. A lens barrel according to claim 13, wherein focusing operation is conducted by the axial displacement of said lens support member.

15. A lens barrel according to claim 14, wherein a member provided with a cam follower is rotated about the optical axis by the rotation of said first motor, and said lens support member is axially displaced by the contact of a cam provided on said lens support member with said cam follower.

16. A lens barrel according to claim 14, further comprising gears for transmitting the rotation of said first motor to a focusing member, said gears being rotatably supported by said lens support member.

17. A lens barrel according to claim 13, further comprising a circuit board bearing circuits for driving said first and second motors and provided on said lens support member.

18. A lens barrel, comprising:
a focusing member supporting rotatably about an optical axis;
a lens support member supporting a lens and supported movably in the axial direction;
a moving mechanism for axially moving said lens support member in response to the rotation of said focusing member about the optical axis; and
a first motor, provided on said lens support member, for rotating said focusing member and a second motor, provided on said lens support member, for driving a diaphragm mechanism.

19. A lens barrel according to claim 18, wherein focusing operation is conducted by the axial displacement of said lens support member.

20. A lens barrel according to claim 19, wherein said moving mechanism includes a cam and a cam follower.

21. A lens barrel according to claim 18, further comprising a circuit board bearing circuits for driving said first and second motors and provided on said lens support member.

22. A lens barrel according to claim 18, further comprising gears for transmitting the rotation of said first motor to said focusing member, said gears being rotatably supported on said lens support member.

23. A lens barrel, comprising:
a) a fixed tube member;
b) a reinforcing ring fixed on the internal periphery of said fixed tube member;
c) a rotary member supported movably only about an optical axis with respect to said reinforcing ring, said rotary member being provided with a sliding contact portion to be in sliding contact with said reinforcing ring, and fingers for preventing disengagement from said reinforcing ring.

24. A lens barrel according to claim 23, wherein said fixed tube member and said reinforcing ring are bayonet coupled.

25. A lens barrel, comprising:
a) A lens support member for supporting a lens and provided with a key portion; and
b) a fixed tube member provided with a key groove extended in the direction of an optical axis and adapted to accommodate said key portion, and a mount portion adapted for coupling with a camera body, said mount portion being formed in a body with said fixed tube member, said key groove being formed by portions projected in a radial direction on an inside surface of said fixed tube member.

26. A lens barrel according to claim 25, wherein said lens support member is positioned on the internal periphery of said fixed tube member.

27. A lens barrel according to claim 25, further comprising a focusing member for moving said lens support member in the direction of the optical axis, wherein said focusing member is adapted to axially move said lens support member in response to the rotation of said focusing member about the optical axis.

28. A lens barrel, comprising:
a first lens support member directly supporting a lens on the internal periphery thereof, said member being provided on the internal periphery thereof, with a first protruding portion for axially defining the position of said lens and a second radially protruding portion; and
a second lens support member for supporting said first lens support member, said second lens support member being provided with a recess in which said second protruding portion can be axially inserted and an engaging portion for engaging with said second protruding portion upon rotation of said first lens support member by a predetermined angle.

29. A lens barrel according to claim 28, wherein said second protruding portion and said engaging portion are bayonet coupled.

30. A lens barrel, comprising:
a) a fixed tube member;
b) a movable member positioned axially movably inside said fixed tube member and provided thereon with a lens driving motor, gears for transmitting the rotation of said motor, and a clutch for switching connected or unconnected state to said gears;
c) a clutch operating member rendered movable with respect to said first tube member; and
d) a link mechanism for enabling to switch said clutch by the movement of said clutch operating member, irrespective of the axial movement of said movable member.

31. A lens barrel according to claim 30, wherein said movable member supports a lens for focusing.

32. A lens barrel according to claim 31, further comprising a rotary member to be rotated about the optical axis by the rotation of said motor; and a moving mechanism for axially moving said movable member, in response to the rotation of said rotary member about the optical axis.

33. A lens barrel according to claim 32, wherein said moving mechanism includes a cam and a cam follower to be in contact with said cam.

34. A lens barrel, comprising:
a lens drive means for driving a movable lens; and gear means for transmitting the driving force of said lens drive means to a driven member, wherein said gear means includes plural gears and plural gear shafts for supporting said gears, and at least one of said plural gear shafts is formed elastically deformable in the radial direction.

35. A lens barrel according to claim 34, further comprising a guide member for guiding the direction of deformation of a first gear shaft capable of said elastic deformation, wherein said guide member is adapted to guide the elastic deformation of said first gear shaft along an arc having the center at a second gear shaft which supports a second gear meshing with the first gear supported by said first gear shaft.

36. A lens barrel according to claim 35, wherein said driven member is a focusing lens.

37. A lens barrel according to claim 34, wherein said driven member is a focusing lens.

* * * * *

UNITED STATES PATENT AND TRADEMARK OFFICE
CERTIFICATE OF CORRECTION

PATENT NO. : 5,264,966

DATED : November 23, 1993

INVENTOR(S) : TADANORI OKADA, ET AL.

It is certified that error appears in the above-indentified patent and that said Letters Patent is hereby corrected as shown below:

Column 1,
    line 61, "tend" should read --tends--.

Column 4,
    line 9, "the focusing the focusing" should read --the focusing--; and
    line 29, "laid-Open" should read --Laid-Open--.

Column 5,
    line 15, "view" should read --views--; and
    line 62, "dusts" should read --dust--.

Column 11,
    line 66, "member" should read --member,--; and "axis" should read --axis,--.

Column 13,
    line 34, "supporting" should read --supported--.

UNITED STATES PATENT AND TRADEMARK OFFICE
CERTIFICATE OF CORRECTION

PATENT NO. : 5,264,966
DATED : November 23, 1993
INVENTOR(S) : Tadanori Okada, et al.

It is certified that error appears in the above-indentified patent and that said Letters Patent is hereby corrected as shown below:

Column 14, line 27, "provided" should read --provided,--.

Signed and Sealed this

Twenty-sixth Day of July, 1994

*Attest:*

BRUCE LEHMAN

*Attesting Officer*     *Commissioner of Patents and Trademarks*